United States Patent
Hahnlen et al.

(10) Patent No.: US 11,351,590 B2
(45) Date of Patent: Jun. 7, 2022

(54) FEATURES OF DISSIMILAR MATERIAL-REINFORCED BLANKS AND EXTRUSIONS FOR FORMING

(71) Applicants: Honda Motor Co., Ltd., Tokyo (JP); Ohio State Innovation Foundation, Columbus, OH (US)

(72) Inventors: Ryan M. Hahnlen, Dublin, OH (US); Duane Trent Detwiler, Powell, OH (US); Allen B. Sheldon, Columbus, OH (US); Marcelo J. Dapino, Columbus, OH (US); Mark Bryant Gingerich, Columbus, OH (US); Leon M. Headings, Columbus, OH (US)

(73) Assignees: HONDA MOTOR CO., LTD., Tokyo (JP); OHIO STATE INNOVATION FOUNDATION, Columbus, OH (US)

( * ) Notice: Subject to any disclaimer, the term of this patent is extended or adjusted under 35 U.S.C. 154(b) by 224 days.

(21) Appl. No.: 16/058,440

(22) Filed: Aug. 8, 2018

(65) Prior Publication Data

US 2019/0047031 A1 Feb. 14, 2019

Related U.S. Application Data

(60) Provisional application No. 62/543,471, filed on Aug. 10, 2017.

(51) Int. Cl.
*B23K 20/10* (2006.01)
*B21D 22/02* (2006.01)
(Continued)

(52) U.S. Cl.
CPC ........... *B21D 22/02* (2013.01); *B21D 35/007* (2013.01); *B21D 53/88* (2013.01); *B23K 20/10* (2013.01);
(Continued)

(58) Field of Classification Search
None
See application file for complete search history.

(56) References Cited

U.S. PATENT DOCUMENTS

| | | | |
|---|---|---|---|
| 3,663,356 A | 5/1972 | Li | |
| 6,988,757 B2* | 1/2006 | McLaren | B62D 25/06 296/146.8 |

(Continued)

FOREIGN PATENT DOCUMENTS

| | | |
|---|---|---|
| CN | 102107535 | 6/2011 |
| CN | 102672328 | 9/2012 |

(Continued)

OTHER PUBLICATIONS

Patel et al.—Ultrasonic Welding of Aluminum to Steel, Metallurgical and Materials Transactions A, Mar. 2014 (Year: 2014).*

(Continued)

*Primary Examiner* — Devang R Patel
(74) *Attorney, Agent, or Firm* — Rankin, Hill & Clark LLP (57) ABSTRACT

A method of adding a reinforcement to a metal blank prior to a forming process. The reinforcement is attached via ultrasonic additive manufacturing (UAM) to create a composite blank which is then subjected to a forming process to bend and deform the composite blank and form a reinforced vehicle component. The reinforcement is placed on the metal blank such that after being subjected to the forming process, there is reinforcement in key areas of the formed vehicle component. The reinforcement results in the final formed vehicle component having enhanced properties such as lower density, increased strength, stiffness, or energy absorption capabilities.

14 Claims, 4 Drawing Sheets

(51) Int. Cl.
  *B21D 35/00* (2006.01)
  *B21D 53/88* (2006.01)
  *B23P 15/00* (2006.01)
  *B23K 103/20* (2006.01)
  *B23K 101/00* (2006.01)
  *B23K 103/10* (2006.01)
  *B23K 103/04* (2006.01)

(52) U.S. Cl.
  CPC ........ *B23P 15/00* (2013.01); *B23K 2101/006* (2018.08); *B23K 2103/04* (2018.08); *B23K 2103/10* (2018.08); *B23K 2103/20* (2018.08)

(56) References Cited

U.S. PATENT DOCUMENTS

| | | | |
|---|---|---|---|
| 7,115,324 B1* | 10/2006 | Stol | B23K 9/02 428/594 |
| 7,829,165 B2 | 10/2010 | Grandominico et al. | |
| 8,082,966 B2* | 12/2011 | Short | B23K 20/106 156/580.2 |
| 8,262,968 B2* | 9/2012 | Smith | B29C 45/1671 264/254 |
| 8,640,320 B2* | 2/2014 | Carsley | B23K 37/0408 29/509 |
| 8,647,453 B2 | 2/2014 | Doorbar | |
| 9,126,632 B2 | 9/2015 | Ono | |
| 9,446,475 B2* | 9/2016 | Norfolk | B23K 35/0255 |
| 10,843,741 B2 | 11/2020 | Nakamoto et al. | |
| 10,870,166 B2 | 12/2020 | Hahnlen | |
| 10,894,566 B2 | 1/2021 | Lang et al. | |
| 2002/0112435 A1* | 8/2002 | Hartman | E04D 3/366 52/648.1 |
| 2006/0165884 A1 | 7/2006 | White et al. | |
| 2009/0117366 A1 | 5/2009 | Honma | |
| 2010/0141009 A1* | 6/2010 | Kirch | B60N 2/682 297/452.18 |
| 2013/0309520 A1 | 11/2013 | Lang et al. | |
| 2014/0193659 A1 | 7/2014 | Lanzerath et al. | |
| 2015/0050453 A1 | 2/2015 | Carson, Jr. et al. | |
| 2015/0217395 A1* | 8/2015 | Spinella | F16B 37/061 219/86.22 |
| 2015/0352661 A1* | 12/2015 | Karlen | B33Y 80/00 428/586 |
| 2016/0028216 A1 | 1/2016 | Pal | |
| 2016/0045978 A1* | 2/2016 | Wang | B23K 20/10 219/91.2 |
| 2017/0008333 A1 | 1/2017 | Mason et al. | |
| 2017/0057005 A1 | 3/2017 | Wisniewski | |
| 2017/0286821 A1 | 10/2017 | Nardi et al. | |
| 2017/0287685 A1 | 10/2017 | Ferrasse et al. | |
| 2018/0058327 A1 | 3/2018 | Tajiri et al. | |
| 2018/0058473 A1 | 3/2018 | Kenworthy et al. | |
| 2018/0222150 A1 | 8/2018 | Petrucci et al. | |
| 2018/0346034 A1 | 12/2018 | Sheldon et al. | |
| 2018/0361481 A1 | 12/2018 | Tenhaeff | |
| 2019/0033719 A1 | 1/2019 | Cole | |
| 2019/0047031 A1 | 2/2019 | Hahnlen et al. | |
| 2019/0061032 A1 | 2/2019 | Wolcott | |
| 2019/0061042 A1 | 2/2019 | Hahnlen et al. | |
| 2020/0139480 A1 | 5/2020 | Sigler et al. | |
| 2021/0173475 A1 | 6/2021 | Qian et al. | |
| 2021/0197457 A1 | 7/2021 | Broach et al. | |
| 2021/0276126 A1 | 9/2021 | Chen et al. | |
| 2021/0309304 A1 | 10/2021 | Mueller et al. | |

FOREIGN PATENT DOCUMENTS

| | | |
|---|---|---|
| CN | 103551721 | 2/2014 |
| CN | 105689906 | 6/2016 |
| EP | 2754546 | 7/2014 |
| JP | 2005199327 | 7/2005 |
| WO | WO2012036262 | 2/2014 |

OTHER PUBLICATIONS

Davies et al.—Aluminum tailor-welded blanks for Automotive applications, JOM article, 1999 (Year: 1999).*

Notice of Allowance of U.S. Appl. No. 15/885,895 dated Aug. 18, 2020, 10 pages.

Yang "Fabrication of Long-Fiber-Reinforced Metal Matrix Composites Using Ultrasonic Consolidation" Utah State University, 2008.

"Driving higher strength and lower weights" Fabrisonic, http://fabrisonic.com/metal-matrix-composites/ (Accessed Sep. 3, 2015).

Office Action of U.S. Appl. No. 15/885,895 dated Jan. 6, 2020, 21 pages.

Office Action of U.S. Appl. No. 15/689,095 dated Mar. 5, 2019, 17 pages.

Office Action of U.S. Appl. No. 17/124,859 dated Sep. 1, 2021, 22 pages.

Office Action of U.S. Appl. No. 17/018,289 dated Dec. 16, 2021, 42 pages.

Office Action of U.S. Appl. No. 16/737,234 dated Nov. 10, 2021, 41 pages.

Notice of Allowance of U.S. Appl. No. 17/124,859 dated Nov. 16, 2021, 15 pages.

Notice of Allowance of U.S. Appl. No. 16/737,234 dated Feb. 7, 2022, 13 pages.

* cited by examiner

FEATURES OF DISSIMILAR MATERIAL-REINFORCED BLANKS AND EXTRUSIONS FOR FORMING

The present application claims priority to U.S. Provisional Patent Application Ser. No. 62/543,471, filed on Aug. 10, 2017, which is incorporated herein by reference.

BACKGROUND

Automobile components/parts are often produced from a substantially flat blank material (e.g. sheet metal) by subjecting the blank to a forming process (e.g. stamping, extruding, etc.) so that the blank is formed into a desired contoured shape. In an effort to reduce the weight of vehicles and increase fuel efficiency, the gauge (i.e. thickness) of material used in these formed automobile components is reduced. However, in reducing the gauge of the material used in the formed component, the strength and other characteristics of the formed component is reduced or otherwise compromised. In order to address this reduction in strength associated with the reduction in gauge, several methods are used to reinforce the formed components.

Conventional reinforced formed components include adhesive patches (both non-reinforced and fiber reinforced) placed on the component after it is formed; secondary dissimilar reinforcing structures fastened or welded to the blank or to the formed component; or similar materials welded to the blank prior to forming. Examples of reinforcing strategies include adhesive patches used in metal vehicle door outer panels, spot-welded stiffeners in vehicle frame components, tailor welded and tailor rolled blanks in automobile door inner structures, and patches of reinforcing steel that are spot welded to steel blanks prior to forming. Bolt attachment points for high stress components, like door hinges, are often reinforced using thicker sheet material in tailor welded blanks or reinforcement metal plates attached after forming. Other methods for generating formed vehicle components with spatially variable properties include variable quench hot stamping and selective post-forming heat treatments.

To date, a key method of reducing the weight of vehicles has been the use of "down-gauging" sheet metal components or changing to a "lightweight" material such as aluminum from steel. With respect to formed metal components, reducing the gauge of a sheet metal blank has an inherent limitation based upon strength, stiffness, energy absorption, or fatigue properties required for the formed metal component. Although lightweight materials may be less dense than steel, they often have lower strength and are less stiff.

In a similar manner, extruded vehicle components must have a uniform wall thickness, and therefore a uniform strength and stiffness, along the extrusion direction, such that the wall thickness is based on the requirements of the most highly loaded region of the component.

BRIEF DESCRIPTION

According to one aspect, a method of preparing a vehicle component includes providing a metal blank comprising a first metal, and a metal reinforcement comprising a second metal. The method includes ultrasonic welding the reinforcement to the metal blank to provide a composite blank, and deforming the composite blank to form the vehicle component. The reinforcement includes a stack of one or more metal layers. If the reinforcement comprises two or more metal layers, then the two or more metal layers are ultrasonically welded to each other. In one embodiment, the second metal is different from the first metal. The second metal could be a discretely reinforced metal-matrix composite.

In another aspect, a vehicle includes a stamped composite blank. The stamped composite blank comprises before stamping a substantially flat metal blank ultrasonically welded to a metal reinforcement. The metal blank comprises a first metal, and the reinforcement comprises a second metal. The stamped composite blank is contoured. The reinforcement includes a stack of one or more metal layers. If the reinforcement comprises two or more metal layers, then the two or more metal layers are ultrasonically welded to each other. In one embodiment, the second metal is different from the first metal. The second metal could be a discretely reinforced metal matrix composite.

DETAILED DESCRIPTION

A vehicle component and related methods are provided that include a multimaterial vehicle component with spatially varying material properties, which achieves reduced mass and meets overall requirements for the vehicle component with respect to strength, stiffness, and energy absorption. The instant multimaterial solution addresses barriers present in the current automotive manufacturing process relating to forming, fixity (location stability during the manufacturing process), joining, and thermal expansion. In this regard, spatial variation of various material properties within the formed component is only coarsely possible with conventional manufacturing technology.

The present subject matter addresses these concerns and allows for the reinforcement of a metal blank with metallic and/or fiber reinforcements that comprise material that is similar or dissimilar to the metal blank. The reinforcements are attached discretely to the metal blank prior to forming operations that bend and otherwise deform the metal blank to produce a formed vehicle component. The reinforcements attached to the metal blank serve to reinforce the formed vehicle component. As used herein, "reinforce" and cognate terms means to increase one or more metrics of strength, stiffness, energy absorption, and fatigue life for the formed vehicle component as compared to a similar vehicle component formed from the metal blank but not including the reinforcements. The present methods create a formed vehicle component with reinforcement in desired locations on the component, which provides a vehicle component that is stronger than one made using sheet material alone. The process allows thinner gauge material to be used as the metal blank, which results in a corresponding reduction in weight, yet the formed vehicle component still maintains the required performance characteristics as if made from a uniformly thicker sheet material. The current methods are beneficial because thinner gauge metal blanks and lower strength materials are easier to form than thicker gauge metal blanks, giving the possibility of reduced manufacturing costs.

The present subject matter enables lightweight construction, higher performance (e.g. strength, stiffness, energy absorption, and fatigue life) than homogenous sheet material, tailored spatially variable properties, more robust attachment of reinforcements to the metal blank, reduced part count, and reduced manufacturing costs by eliminating ultra-high strength blanks, hot formed blanks, and tailor welded/tailor rolled blanks.

In several embodiments, reinforcement is added to a metal blank or stock extrusion prior to a forming process. The metal blank may include a substantially flat sheet metal material or a metal extrusion. The metal blank may comprise or consist of a first metal. The first metal is not particularly limited and may comprise aluminum or an aluminum-based alloy. Other metals and metal alloys may be used.

The reinforcement may comprise or consist of a second metal. The second metal may be identical to or may be different from the first metal. If different from the first metal, the second metal may be at least one of stronger, stiffer, have greater energy absorption, and have increased fatigue life than the first metal. The second metal is not particularly limited and may comprise steel or a steel-based alloy or a steel-based composite. As described, the reinforcement may consist of the same material as the metal blank.

The reinforcement may be added to the metal blank via Ultrasonic Additive Manufacturing (UAM). UAM is a solid-state (i.e. no melting) continuous, additive metal welding process which provides fully dense, gapless three dimensional parts. In the UAM process, an ultrasonic welder may be used, which includes a sonotrode (i.e. horn) driven by one or more piezoelectric transducers to impart ultrasonic vibrations under a compressive force to a metal part to be joined. The sonotrode operates at a vibration frequency of about 20 kHz (nominal) that is transverse to the metal part to create plastic deformation between the metal part and the material to which it is being welded. When two metal parts are being ultrasonically welded, vibrations imparted by the sonotrode on the workpiece along with a static compressive force cause a metallurgical bond to form between the two metal parts. Process temperatures are low, typically below 150° C., and thus inhibit the formation of brittle intermetallics, inhibit altering the microstructure of the metals, and inhibit heat-induced distortion or property degradation of the metals.

Ultrasonic Additive Manufacturing is useful for joining the reinforcement to the metal blank because it is a low temperature process, meaning that it will not alter the effect of prior heat treatments or the microstructure of the metal blank on a meso- or macro-scale, and is able to join dissimilar metal materials without formation of adverse intermetallic compounds. Second, as discussed in more detail herein, UAM produces a continuous hermetic bond, meaning any secondary reinforcement materials can be isolated from the exterior environment thereby avoiding corrosion or infiltration by contaminants such as an electrolyte.

As will be discussed in more detail, UAM can be used to join dissimilar materials (i.e. different metals) and allows for embedding fibers within the metals being joined. The reinforcement is arranged on the metal blank in such a way that, after forming, the reinforcement is located in key areas/regions of the formed component for enhanced properties such as increased strength, stiffness, or energy absorption capabilities.

The material of the reinforcement may be the same as, or different than the metal blank. The reinforcement may be a homogenous material, such as steel, and it may comprise a stack of one or more metal layers that are UAM welded to each other. The reinforcement may be a discretely reinforced metal matrix composite (DRx); or it may include one of these as a primary reinforcement and additionally include a secondary reinforcement. The secondary reinforcement may include reinforcing fibers, tows, threads, wire, cables, meshes, fabrics, and/or veils, the composition of which is not particularly limited and may be chosen to modify a particular performance characteristic of the final vehicle component as desired. As used herein, a fiber is a single elongated piece of a given material; a tow is an untwisted bundle of fibers; a thread is a twisted bundle of fibers; meshes and fabrics can include fibers, tows, and threads; veils are non-woven mats or substantially randomly placed fibers. The reinforcing fibers may include for example, high strength steel wires, titanium fibers, carbon fibers, ceramic fibers such as silicon carbide fibers, poly(p-phenylene-2,6-benzobisoxazole) (PBO) fibers such as Zylon®, ultra-high molecular weight polyethylene (UHMWPE) fibers such as Dyneema®, etc., to increase strength and stiffness. The secondary reinforcement may be included between the metal blank and the primary reinforcement.

Figure 1A:
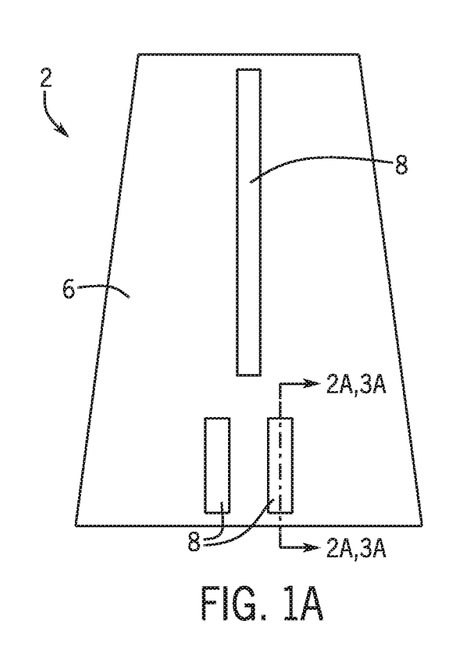
FIG. 1A is a schematic plan view of a composite blank before being subject to a forming operation in accordance with the present subject matter.
Figure 1B:
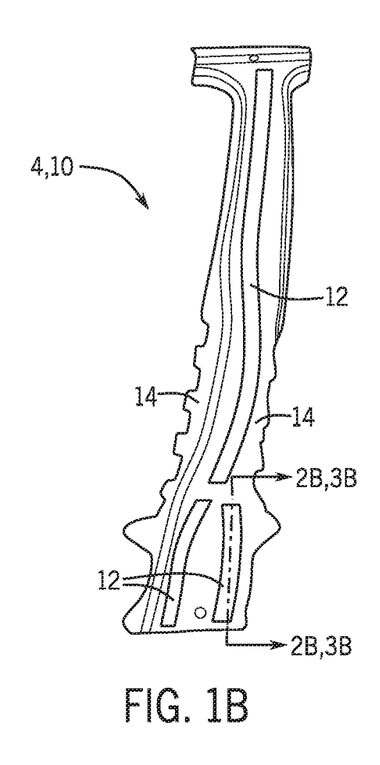
FIG. 1B is a schematic plan view of a vehicle component formed by subjecting the composite blank of FIG. 1 to a forming operation in accordance with the present subject matter.

Referring now to the figures, FIG. 1A depicts a composite blank 2 before being subject to a forming operation, and FIG. 1B depicts a reinforced vehicle component 4 produced by subjecting the composite blank 2 to a forming operation. In a non-limiting example, the forming operation may include cold stamping of the composite blank 2 such that the reinforced vehicle component 4 consists of a composite blank 2 after having been cold stamped. The composite blank 2 may be substantially flat, and includes a stock metal blank 6 and metal reinforcements 8 ultrasonically welded to the metal blank 6. As depicted, three reinforcements 8 are arranged lengthwise along a length of the metal blank 6 and do not cover the entire metal blank 6. However, the present subject matter is not limited to this particular arrangement of reinforcements 8 on the metal blank 6, and it should be understood that the composite blank 2 can include other arrangements as desired for a particular application, such as the composite blank 2 including one or more reinforcements 8 arranged in orientations different from that depicted in FIG. 1A. The reinforcements 8 may take on alternate arrangements on the metal blank 6, including those with overlapping reinforcements 8, as desired to augment a particular characteristic of the formed vehicle component 4. Further, the reinforcement 8 can cover more or less of the metal blank 6, including covering the entire metal blank 6. In a non-limiting example, the composite blank 2 can include a plurality of reinforcements 8 arranged in a hatch or spider web pattern.

In the case where the reinforcement 8 is a homogenous material or a DRx, and the reinforcement 8 is joined to the metal blank 6 via UAM or other suitable process, then the composite blank 2 is ready to be bent or otherwise deformed in a forming process. The forming process itself may involve extensive plastic deformation or elevated temperatures that will increase the bonding mechanisms of ultrasonic welding, namely plastic deformation that disrupts surface oxides, and high stresses that create close metal-metal contact leading to solid-state bonding of the composite blank 2. Once assembled, the vehicle component 4 may be subject to further down-stream processes such as thermal treatment, which may enable diffusion or grain growth across the metal blank-reinforcement boundary, further increasing strength of the joint between them and the strength of the vehicle component 4 as a whole.

During forming processes, the composite blank 2, which may be substantially flat, is subject to forces that cause the composite blank 2 to undergo bending, stretching, and other deformation that imparts contours to the composite blank 2. Such forming operation can include cold stamping or other forming operations that deform the composite blank 2 and thereby produce a contoured and reinforced vehicle component 4.

The formed vehicle component 4 depicted in FIG. 1B is a B-pillar 10 that has desired contours and a desired shape for application as a B-pillar 10 for a vehicle. However, the vehicle component 4 is not limited to being a B-pillar 10, and can include any vehicle part that is desired. As non-limiting examples, the vehicle component 4 may be another frame member, such as an A-pillar for example, or a vehicle closure outer panel, such as a door or hood outer panel for example. In embodiment where the vehicle component is a door panel, the door panel can be made lighter because a thinner gauge of steel or aluminum is used as the metal blank. Conventionally however, the dent resistance of a thinner gauge door panel may become unacceptable due to a decrease in stiffness. These concerns are addressed by strategically placing reinforcements 8 on the metal blank 6, whereby stiffness can be locally increased allowing the panel to have the required dent resistance. In this way, the metal blank 6 in a vehicle component 4 used as a closure outer panel may be a thinner gauge than a conventional panel, yet the reinforcements 8 may inhibit the reinforced panel from denting when subject to pressure. The reinforced vehicle component 4 acting as a closure outer panel may therefore be lighter and less expensive to produce than a conventional door panel.

As schematically depicted between FIGS. 1A and 1B, the reinforcements 8 are arranged and UAM welded at predetermined locations on the metal blank 6 previously identified by a forming analysis, in order to provide reinforced regions 12 at desired locations on the formed vehicle component 4. Areas on the composite blank 2 that do not include a reinforcement 8 are non-reinforced regions 14 on the vehicle component 4 after the forming process. The arrangement of the reinforced regions 12 and non-reinforced regions 14 on the formed vehicle component 4 correspond to the arrangement of the reinforcements 8 on the composite blank 2, and may also correspond to some degree with the forming process used to deform the composite blank 2. Reinforcement provided by the reinforced regions 12 help to increase at least one of strength, stiffness, energy absorption, and fatigue life at particular locations on the formed vehicle component 4 as compared to a similar vehicle component formed from the metal blank 6 but not including the reinforcements 8. As will be appreciated, the vehicle component 4 may include a different arrangement and number of reinforced regions 12 and non-reinforced regions 14 than that depicted in FIG. 1B. In a non-limiting example, the vehicle component 4 may be free of non-reinforced regions and only include reinforced regions 12.

Figure 2A:
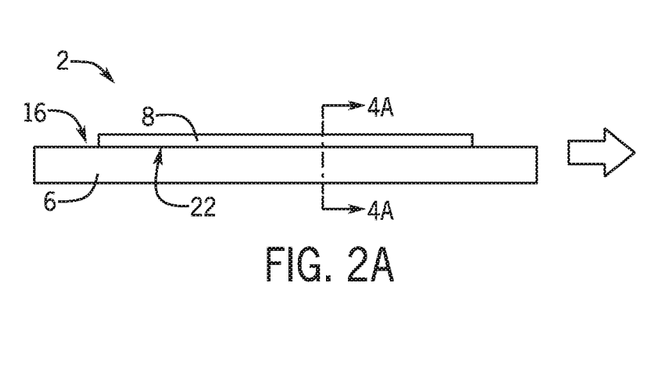
FIG. 2A is a cross-sectional view of the composite blank of FIG. 1A taken along line 2A-2A.

As depicted in FIG. 2A, which is an illustration taken along line 2A-2A of FIG. 1A, the reinforcements 8 may be arranged on a surface 16 of the metal blank 6 and ultrasonically welded to the surface 16 of the metal blank 6. In an alternate embodiment depicted in FIG. 3A, the reinforcements 8 are arranged in a pre-formed depression 18 in the surface 16 of the metal blank 6 and ultrasonically welded to the depression 18 in the metal blank 6. The present subject matter includes reinforcements 8 that are arranged on the surface 16, but can also include reinforcements 8 arranged on the side of the metal blank 6 opposite from surface 16, or on both sides of the metal blank 6 as desired. The pre-formed depression 18 may be formed via subtractive manufacturing processes (e.g. milling, grinding, drilling, etc.) or by an initial local forming process (e.g. by an extrusion die, stamping, beading, etc.).

Figure 3A:
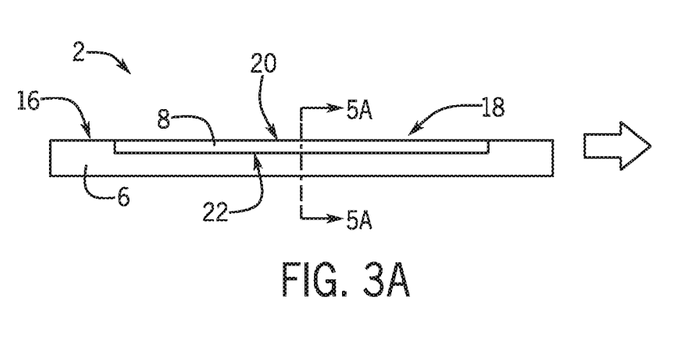
FIG. 3A is an alternate cross-sectional view of the composite blank of FIG. 1A taken along line 3A-3A.

As depicted in FIG. 3A, the depression 18 is configured such that a surface 20 of the reinforcement 8 lays flush with the surface 16 of the metal blank 6. However, this is not required and the depression 18 may be differently configured such that the reinforcement 8 may still partially sit inside the depression 18, but the surface 20 of the reinforcement 8 may not be flush with the surface 16 of the metal blank 6, and instead the reinforcement 8 may protrude up past the surface 16 of the metal blank 6 to a certain degree. Alternatively, the surface of the metal reinforcement 8 may remain slightly below the surface 16 to account for thinning of the metal blank 6 during the forming process.

Figure 2B:
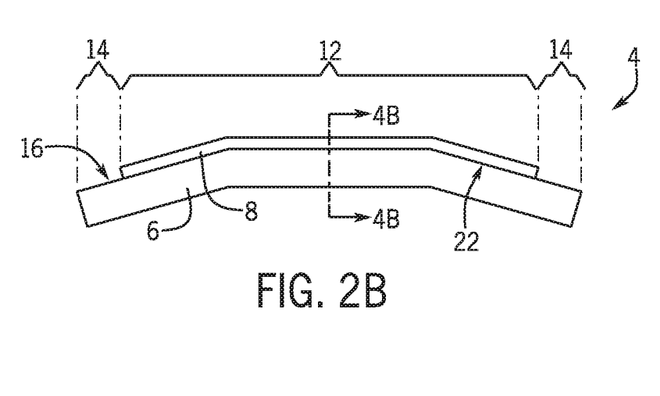
FIG. 2B is a cross-sectional view the vehicle component of FIG. 1B taken along line 2B-2B.

By including the depression 18 in the metal blank 6, the welded interface 22 between the metal blank 6 and the reinforcement 8 is recessed within the mass of the metal blank 6 (FIGS. 3A and 3B), instead of the welded interface 22 being located at the surface 16 of the metal blank 6 (FIGS. 2A and 2B). When the interface 22 is recessed within the mass of the metal blank 6 (FIGS. 3A and 3B), the interface 22 may therefore be protected from electrolyte (such as water that can induce galvanic corrosion between two dissimilar materials such as an aluminum metal blank 6 and a steel reinforcement 8, for example) especially if a sealant is applied to prevent water from penetrating into the joint or to prevent water from contacting one or both of the metal blank 6 and the reinforcement 8. Since the interface 22 is recessed and because ultrasonic welding provides a hermetic seal, electrolyte present in the environment may be prevented from reaching the welded interface 22 and causing galvanic reactions at the interface 22. When the interface 22 is not recessed (FIGS. 2A and 2B), the vehicle component may include a sealant (not shown) to inhibit electrolyte from reaching the welded interface 22 or from simultaneously contacting the metal blank 6 and the reinforcement 8.

Where the reinforcement 8 consists of a material that is different than the metal blank 6, the reinforcement 8 may be encapsulated and thereby isolated from environmental electrolyte (e.g. water) by using a top coating or layer covering the entire reinforcement 8. The top coating or layer may consist of a material that is galvanically compatible with the metal blank 6, such as the same metal used in the metal blank 6 or a sealant material that is not galvanically reactive with the metal blank 6. The top coating or layer, if consisting of the same metal used in the metal blank 6, may be ultrasonically welded over the reinforcement to hermetically encapsulate the reinforcement 8 and thereby protect the dissimilar material of the reinforcement 8 and the metal blank 6 from exposure to electrolyte.

Figure 3B:
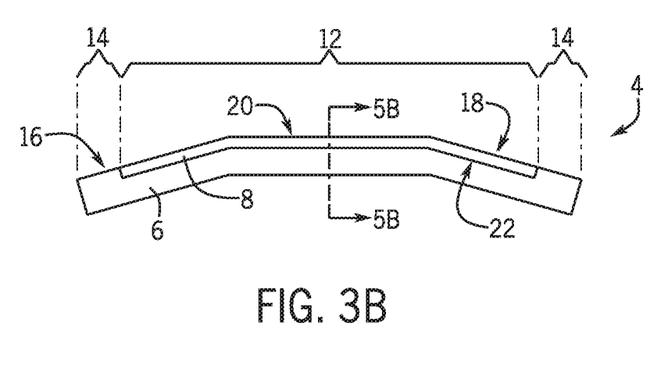
FIG. 3B is an alternate cross-sectional view the vehicle component of FIG. 1B taken along line 3B-3B.

As depicted between FIGS. 2A and 2B and between FIGS. 3A and 3B, the forming operation deforms the composite blank 2 from being, for example, substantially flat (FIGS. 2A and 3A), to having contours and thereby forming the reinforced vehicle component 4 (FIGS. 2B and 3B). As depicted, the reinforced vehicle component 4 may include reinforced regions 12 and non-reinforced regions 14. As will be understood, the composite blank 2 may be subject to various and non-uniform bending forces during the forming operations. For example, the upper portion of the composite blank 2 shown in FIGS. 2A and 3A may be stretched and the lower portion may be compressed in order to produce the upward deflecting bend in the vehicle component 4 shown in FIGS. 2B and 3B, respectively. The composite blank 2 may be subject to other forces during forming processes. As will be appreciated, the reinforcements 8 may be arranged on portions of the metal blank 6 that are substantially deformed during a forming process, that are not substantially deformed (such as the flat regions of FIGS. 2B and 3B), or on a combination thereof (such as spanning between regions that are substantially deformed and those that are not substantially deformed as shown in FIGS. 2B and 3B).

In several embodiments, reinforcing fibers 24 may be used as a secondary reinforcement to provide additional reinforcement to the vehicle component 4 in addition to the reinforcement provided by the metal reinforcement 8, which acts as a primary reinforcement. By "primary" and "secondary", such terms are not meant to indicate the relative amount or level of reinforcement provided, but are used to differentiate between the metal reinforcement 8 and the reinforcing fibers 24.

The reinforcement 8 includes one or more metal layers. In one embodiment (FIGS. 4 and 5), the reinforcement 8 includes only one metal layer. In this embodiment and as depicted in FIGS. 4 and 5, the reinforcing fibers 24 (i.e. secondary reinforcement) are arranged between the metal blank 6 and the metal reinforcement 8 (i.e. primary reinforcement), which is ultrasonically welded to the metal blank 6.

In another embodiment (FIGS. 6 and 7), the reinforcement 8 includes a stack of two or more metal layers 32, 34 that are ultrasonically welded together. As depicted in FIGS. 6 and 7, the reinforcing fibers 24 are arranged between and encapsulated by the layers 32, 34 of the metal reinforcement 8. In this embodiment, the reinforcement can include multiple layers of different materials or the same material. By including multiple layers in the reinforcement 8, this embodiment can provide increased welding compatibility with the metal blank 6, improved corrosion mitigation between the metal blank 6 and the reinforcement 8, improved thermal expansion matching between the metal blank 6 and the reinforcement 8, and allows for specific material placement for optimal structural benefit to the formed vehicle component 4. In one aspect, the reinforcement 8 includes a first steel layer, a second aluminum layer, a third metal matrix composite (MMC) layer (e.g. "Metpreg" available from Touchstone Research Laboratory Ltd. of Triadelphia, W. Va., which is made from aluminum reinforced with high-strength, high-stiffness ceramic fibers), a fourth aluminum layer, and a fifth MMC layer. In another aspect, the reinforcement 8 includes a first steel layer, and a series of alternating layers of aluminum and titanium, e.g. four layers of aluminum and four layers of titanium. In still another aspect, the reinforcement 8 includes an aluminum layer and a titanium layer. The reinforcement 8 is not limited to these aspect, and can include other arrangements and numbers of layers. The various layers of the reinforcement 8 may be applied to the metal blank 6 by ultrasonic welding each of the layers of the reinforcement 8 one at a time to the metal blank 6; or by first welding all the layers of the reinforcement 8 together, and then ultrasonic welding the reinforcement 8 to the metal blank 6. The reinforcing fibers 24 can be arranged between two of the layers of the reinforcement 8 before they are ultrasonically welded together, or between the reinforcement 8 and the metal blank 6 before they are ultrasonically welded together.

In FIGS. 4, 5, 6, and 7, the reinforcing fibers 24 are shown in cross section. As will be appreciated, the reinforcing fibers 24 have a length that runs parallel to a length of the metal reinforcement 8 and are completely covered by the metal reinforcement 8, which may act to protect the fibers 24 from abrasion and exposure to the environment during use of the vehicle component 4. However it should be understood that the reinforcing fibers 24 may be arranged differently, such as being oriented in different directions with respect to the reinforcement 8, and may not be completely covered by the reinforcement 8.

The fibers 24 may be arranged in a pre-formed channel or groove 26 in the metal blank 6 (FIGS. 4A and 5A) or in one of the metal layers (e.g. the first metal layer 32) of the reinforcements 8 (FIGS. 6A and 7A) before the reinforcements 8 are ultrasonically welded with the metal blank 6. That is, the grooves 26 are present in the metal blank 6 or in one of the metal layers (e.g. the first metal layer 32) of the reinforcements 8 before the fibers 24 are arranged in the grooves 26 and before the reinforcements 8 are ultrasonically welded with the metal blank 6 or before the metal layers 32, 34 are ultrasonically welded together. As shown, three tows of fibers 24 are arranged in three grooves 26. However, more or less tows of fibers 24 and grooves 26 may be included. The pre-formed grooves 26 may be formed via subtractive manufacturing processes (e.g. milling, grinding, drilling, etc.) or by an initial local forming process (e.g. by an extrusion die, stamping, beading, etc.). As depicted, the fibers 24 are arranged only about half way within the grooves 26. However, it will be appreciated that the fibers 24 may be arranged more or less than half way within the grooves 26, for example in FIG. 4, the fibers 24 may be completely below the surface 16 of the metal blank 6.

Figure 5A:
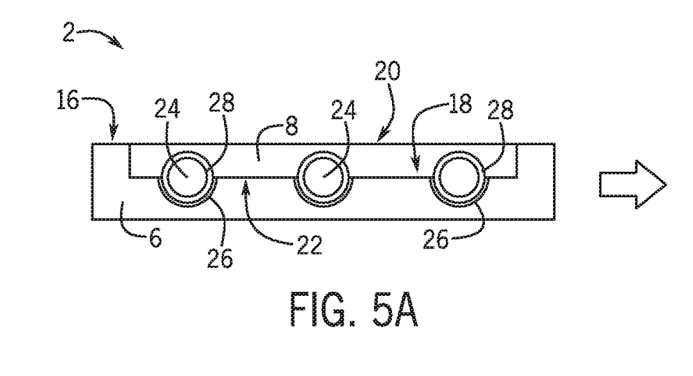
FIG. 5A is a cross-sectional view of an embodiment of the composite blank of FIG. 3A taken along line 5A-5A.

As shown in FIG. 5A, the grooves 26 are arranged at the bottom of the depression 18 in the metal blank 6. As such, the reinforcing fibers 24 and the reinforcement 8 are both arranged in a pre-formed depression 18 present in the metal blank 6, with only the fibers 24 being arranged in the grooves 26. In some embodiments, the fibers 24 are not arranged in pre-formed grooves 26. Instead, the fibers 24 may be simply arranged between the metal blank 6 and the reinforcement 8, either at the surface 16 of the metal blank 6 or in the depression 18 in the metal blank 6; or between the layers 32, 34 of the reinforcement 8. In any event, the metal blank 6 and the reinforcement 8, or the layers 32, 34 of the reinforcement 8 are ultrasonically welded together with the fibers 24 arranged therebetween. In embodiments that do not include grooves 26, ultrasonic welding may create channels for the fibers 24 that are formed during the welding process in the metal blank 6 and/or reinforcement 8, or in the layers 32, 34 of the reinforcement 8. Ultrasonic welding may cause metal from the metal blank 6 and/or the reinforcement 8 to impregnate into, or plastically flow around, the tows of fibers 24.

As depicted between FIGS. 4A and 4B, 5A and 5B, 6A and 6B, and 7A and 7B, during deformation of the composite blank 2, the pre-formed grooves 26 may gradually compress around (e.g. squeeze, cinch, contract around, melt into, or flow around) the reinforcing fibers 24 to create a mechanical attachment between the reinforcing fibers 24 and the pre-formed groove 26, wherein the grooves 26 that are schematically depicted in FIGS. 4A, 5A, 6A, and 7A are therefore not depicted in FIGS. 4B, 5B, 6B, and 7B because they have compressed around the reinforcing fibers 24. High plastic deformation during forming may create more compressive stress around reinforcing fibers 24. With this in mind, the grooves 26 may be formed to be oversized with respect to the size of the tows of reinforcing fibers 24 to initially allow relative movement between the grooves 26 and reinforcing fibers 24. However, the grooves 26 gradually collapse during the forming process to create mechanical interlocking and a friction based load transfer between the metal blank 6 and the reinforcing fibers 24 in the formed vehicle component 4. In one embodiment, the forming process stretches the fibers 24, but not beyond their tensile strength, and thereby creates a certain amount of pre-stress loaded in the fibers 24.

Figure 4A:
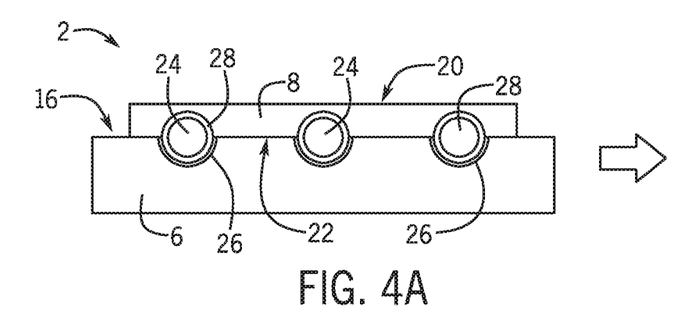
FIG. 4A is a cross-sectional view of an embodiment of the composite blank of FIG. 2A taken along line 4A-4A.
Figure 4B:
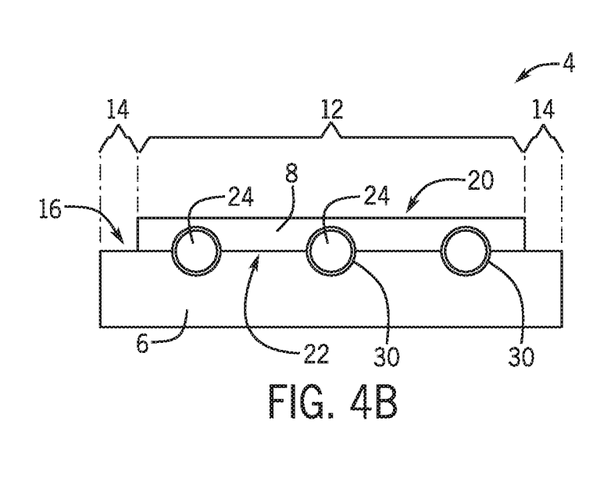
FIG. 4B is a cross-sectional view of an embodiment of the vehicle component of FIG. 2B taken along line 4B-4B.
Figure 5B:
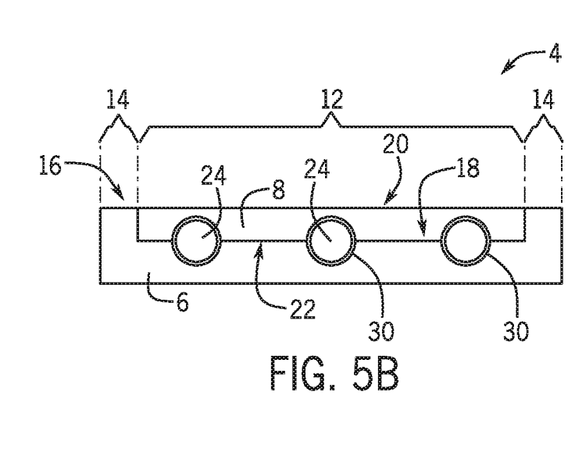
FIG. 5B is a cross-sectional view of an embodiment of the vehicle component of FIG. 3B taken along line 5B-5B.
Figure 6A:
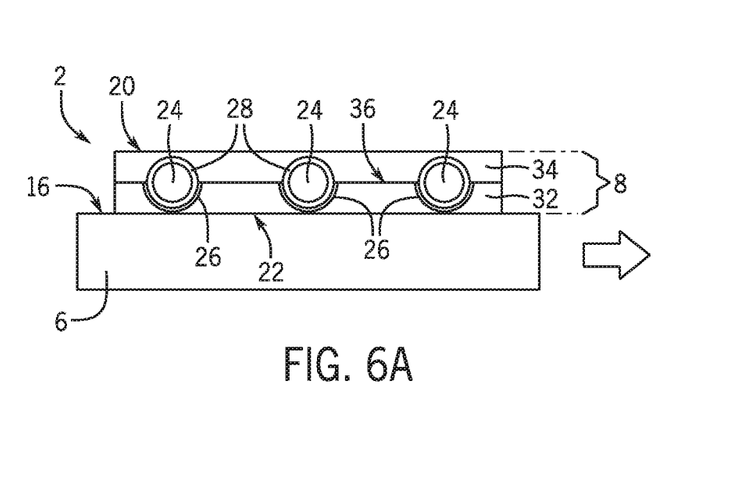
FIG. 6A is a cross-sectional view of another embodiment of the composite blank of FIG. 2A taken along line 6A-6A.
Figure 6B:
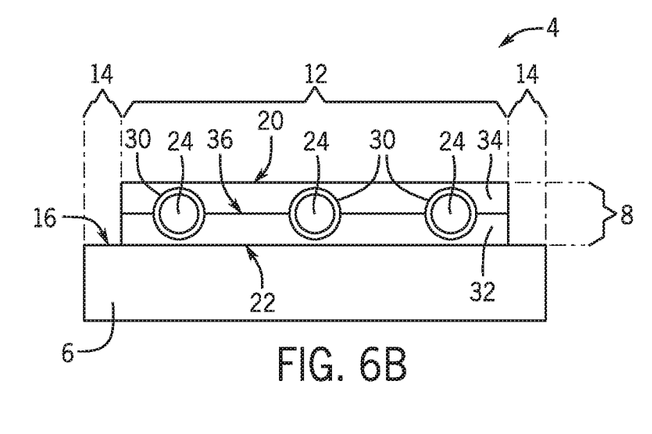
FIG. 6B is a cross-sectional view of another embodiment of the vehicle component of FIG. 2B taken along line 6B-6B.
Figure 7A:
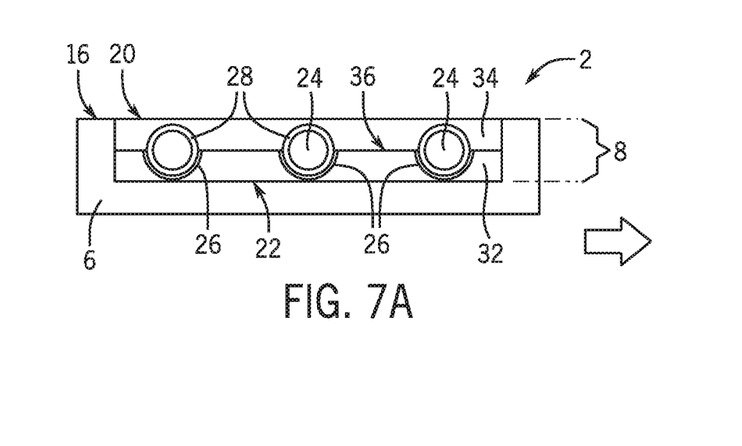
FIG. 7A is a cross-sectional view of another embodiment of the composite blank of FIG. 3A taken along line 7A-7A.
Figure 7B:
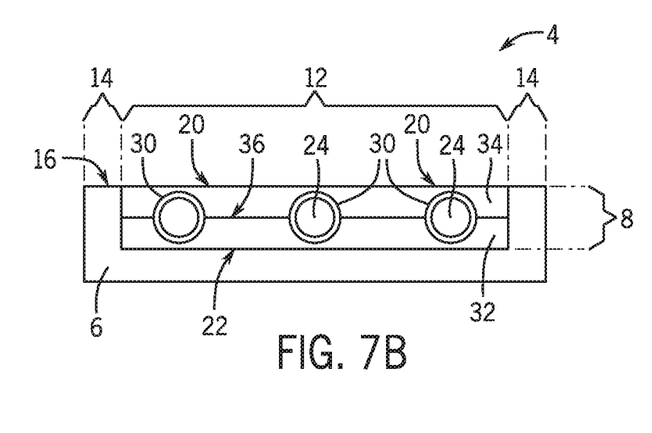
FIG. 7B is a cross-sectional view of another embodiment of the vehicle component of FIG. 3B taken along line 7B-7B.

The composite blank 2 may optionally include a viscous material 28 (e.g. a lubricant or resin) arranged between the reinforcing fibers 24 and at least one of the metal blank 6 and the reinforcement 8 as depicted in FIGS. 4A and 5A, or between the reinforcing fibers 24 and the layers 32, 34 of the reinforcement as depicted in FIGS. 6A and 7A. The viscous material may be included as part of a tow of reinforcing fibers 24, wherein a tow of fibers 24 is impregnated or coated with the viscous material 28. Alternatively, the viscous material 28 may be applied separate from the reinforcing fibers 24. The viscous material 28 may provide lubrication between the reinforcing fibers 24 and at least one of the metal blank 6 and the reinforcement 8 during forming processes, such that the fibers 24 are at least somewhat free to move relative to at least one of the metal blank 6 and the reinforcement 8 during forming, or between the reinforcing fibers 24 and at least one of the layers 32, 34 of the reinforcement 8 to allow for a somewhat free movement of the fibers 24 with respect to the layers 32, 34 during the forming process.

The fibers 24 may be gradually cinched as the grooves 26 gradually compress around them during a forming process, and the fibers 24 may be stretched by deformation of the composite blank 2. For example as shown between FIGS. 2A and 2B, the upper portion of the composite blank 2, which may include reinforcing fibers 24, is stretched in order to produce the upward deflecting bend in the vehicle component 4. Lubrication that may be provided by the viscous material 28 can allow the reinforcing fibers 24 to be cinched less during a forming process, and may therefore allow the reinforcing fibers 24 to not be stretched and tensioned beyond their tensile strength. Instead, the fibers 24 may slide relative to the deforming metal blank 6 and reinforcement 8, i.e. "float" in the grooves 26.

Use of the viscous material 28 is advantageous because if it were not provided, the grooves 26 may form a mechanical attachment to the reinforcing fibers 24 during forming processes, and deformation of the composite blank 2 may cause deformation (i.e. stretching) of the fibers 24. If such deformation exceeded the tensile strength of the fibers 24, then the fibers 24 could rupture and therefore not provide a reinforcing effect to the vehicle component 4. Including the viscous material 28 may address this concern because it may provide lubrication between the grooves 26 and fibers 24, which may inhibit formation of a mechanical attachment between the fibers 24 and the grooves 26 during a forming process and the associated stretching and possible rupture of the fibers 24.

In some embodiments, the reinforcing fibers 24 have a relatively low coefficient of friction, such that a viscous material 28 is not necessary for lubricating the fibers 24 and inhibiting rupture of the fibers 24. In other embodiments, it may be desirable to form a mechanical attachment between the fibers 24 and the grooves 26 before deformation of the composite blank 2. This may be desirable if pre-loaded tension of the fibers 24 is preferred. In such an embodiment, the viscous material 28 may not be included.

After deformation, the viscous material 28 may be dried or be broken down by down-stream processes to develop the load transfer mechanism (e.g. mechanical attachment) between the fibers 24 and at least one of the metal blank 6 and the reinforcement 8. Alternatively, the viscous material 28 may be an uncured liquid adhesive material which may be cured after the forming process, such as during a subsequent paint bake process or in a time dependent reaction. If a heating process is used to cure the adhesive, the adhesive may then form an adhesive bond 30 between the reinforcing fibers 24 and at least one of the metal blank 6 and the reinforcement 8. In this instance, the adhesive coating assists in load transfer from the metal blank 6 to the reinforcement 8. The formed vehicle component 4 may then be included as part of a vehicle.

A method of preparing a vehicle component 4 includes providing a metal blank 6 including a first metal, and a metal reinforcement 8 including a second metal that is the same as, or different from, the first metal. The metal blank 6 and the reinforcement 8 are ultrasonically welded together, thereby providing a composite blank 2. The composite blank 2 is subject to a forming process in which the composite blank 2 is deformed from an initial configuration, for example substantially flat (FIG. 1A), to a subsequent configuration, for example contoured (FIG. 1B), thereby forming the vehicle component 4. The method may also include before ultrasonic welding, arranging the reinforcement 8 at a pre-determined location relative to the metal blank 6 such that after deforming, the reinforcement 8 provides a reinforced region 12 at a desired location on the vehicle component 4. Deforming may include cold stamping. The second metal may be at least one of stronger, stiffer, have greater energy absorption, and have increased fatigue life than the first metal. For example, the first metal may be aluminum or aluminum-based alloy, and the second metal may be a steel or steel-based alloy. The reinforcement 8 may be arranged in a pre-formed depression 18 present in the metal blank 6 before ultrasonic welding, such that the reinforcement 8 is flush with the surface 16 of the metal blank 6 and an ultrasonic welded bond/interface 22 between the metal blank 6 and reinforcement 8 is arranged completely within the depression 18. Alternatively, the reinforcement 8 may be arranged on the surface 16 of the metal blank 6 and not in a depression 18. Ultrasonic welding may be performed using an ultrasonic welder, including a sonotrode, which may contact an entire surface 20 of the reinforcement 8 or only to a portion of the surface 20 of the reinforcement 8. The method may also include providing reinforcing fibers 24, and before ultrasonic welding, arranging the reinforcing fibers 24 between the metal blank 6 and the reinforcement 8 (FIGS. 4 and 5) or between layers 32, 34 of the reinforcement 8 (FIGS. 6 and 7). The reinforcing fibers 24 may be arranged in a pre-formed groove 26 before ultrasonic welding.

The present subject matter also includes a method of making a vehicle, including the steps of providing a reinforced vehicle component 4 as described herein, and assembling a vehicle including the reinforced vehicle component 4.

The present subject matter provides a vehicle including a stamped composite, i.e. the reinforced vehicle component 4. The stamped composite includes before stamping, a substantially flat metal blank 6 ultrasonically welded to a metal reinforcement 8. The metal blank 6 includes a first metal and the reinforcement 8 includes a second metal that is the same as or different from the first metal. The stamped composite is contoured; that is, the stamped composite is not substantially flat. The stamped composite part may further comprise reinforcing fibers 24 arranged between the metal blank 6 and the reinforcement 8, or between layers 32, 34 of the reinforcement 8. The stamped composite part may be a stamped and heated composite part including an adhesive bond 30 between the reinforcing fibers 24 and at least one of the metal blank 6 and the reinforcement 8. The stamped and heated composite part may comprise before heating, a viscous material 28 arranged between the reinforcing fibers 24 and at least one of the metal blank 6 and the reinforcement 8. During stamping, the viscous material 28 may provide lubrication to the reinforcing fibers 24 such that the reinforcing fibers 24 are not tensioned beyond their tensile strength. Upon heating or the passage of time, the viscous material 28 cures to form the adhesive bond 30. The reinforcing fibers 24 and the reinforcement 8 may be arranged in a pre-formed depression 18 present in the metal blank 6.

In a non-limiting example method in accordance with the present subject matter, a metal sheet material is used as a metal blank 6 and is reinforced in key regions previously identified by a forming analysis. A tow of fibers 24 with uncured resin (i.e. viscous material 28) is encapsulated between the metal blank 6 and a reinforcement 8, or between layers 32, 34 of the reinforcement 8. The reinforcement 8 includes a stack of one or more metal layers, and includes different or similar material to the metal blank 6. The reinforcement 8 is welded to the metal blank 6 via a solid-state ultrasonic welding process. This composite blank 2 is next formed in a stamping press, which gives the vehicle component 4 a particular shape. During forming, the resin in the tows acts as a lubricant that allows the fibers 24 to slide rather than be strained to their breaking point. Some fibers 24 are placed in regions that do not exhibit much strain in the fiber length direction. Deformation of the metal sheet material during forming gradually causes grooves 26, in which the fibers 24 are located, to contract and to create a tight mechanical interface between the fibers 24 and grooves 26. The formed vehicle component 4 is then attached to other components to create an auto body-in-white, which then goes through a painting process including one or more heat treatments to cure anti-corrosion and paint coatings. During the heat treatments or simply by the passage of time, the resin in the tows cures, adhering the individual reinforcement fibers 24 to themselves and to the metal sheet material and to the reinforcement 8. In this instance the additional strength and stiffness afforded by the reinforcement 8 and fibers 24 enables the metal sheet material to be thinner, and therefore more lightweight, than would be required for a homogenous stamped part of the same metal sheet material.

In another non-limiting example, the metal blank 6 is a metal extrusion. The extrusion comes in its stock form, straight and cut approximately to length. A depression 18 is applied to the stock extrusion, either through subtractive processes or via a feature of the extrusion die. The purpose of the depression 18 is to accommodate the reinforcement 8, e.g. to allow the surface 20 of the reinforcement 8 to be flush with the surface 16 of the extrusion. A resin impregnated tow of fibers 24 is embedded in a groove 26 between the reinforcement 8 and the extrusion or between layers 32, 34 of the reinforcement, and the reinforcement 8 is then ultrasonically welded to the extrusion. The reinforced extrusion is subjected to forming processes to bend it into the required shape of a vehicle component 4, e.g. an automobile bumper. Here, the fibers 24 are subjected to potential strains which are initially mitigated by the slightly oversized grooves 26 and by the resin, where upon at the end of forming, the grooves 26 have collapsed around the tows, crimping them in place at multiple locations along the length of the tows. This vehicle component 4 is added to an auto body-in-white and subject to a painting process including one or more heat treatment where the resin is cured, completing the integration process. The reinforcement provides at least one of additional strength, stiffness, and energy absorption to allow for the total wall thickness of the extrusion to be reduced, creating a lighter weight vehicle component.

In both of these examples, there is additional cost savings due to the reduced force required to deform thinner gauge materials during a forming process. The reduced force requires less energy to form, but also allows smaller capacity forming systems to be utilized to create components of equal functionality. Also, using thinner gauge metal blanks 6 provides a savings on cost of materials used in the blank 6.

The present subject matter provides embedded reinforcements prior to forming processes, and utilizes forming processes and/or subsequent thermal and mechanical processes to develop the interface between the reinforcement materials and the metal blank. This creates a unique class of metal-matrix material for tailored structural properties not available with other materials and manufacturing methods. The reinforcement materials (i.e. reinforcement 8 and reinforcing fibers 24) allow for a wider range of properties in the vehicle component 4 because the instant methods do not rely on fusion welding processes to integrate reinforcement into the metal blank. Further, unlike adhesives, the proposed method has a wider acceptable temperature range allowing reinforcements to be incorporated earlier in the manufacturing process and in places that may typically be inaccessible after the paint bake process. The instant methods and related vehicle components provide a reduction in weight by localizing an increase in strength and stiffness properties only where it is desired, rather than across the entire vehicle component. Currently, formed parts are limited in thickness reduction by key regions that see the highest loads. In the present subject matter, global part thickness could be further reduced and reinforcement added to key areas only as needed. In the instant subject matter, reinforcement is applied to a flat metal blank before forming processes, thereby reducing the complexity of applying reinforcement material to a body having a complex, curved surface.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of preparing a vehicle component comprising:
   providing a metal blank comprising a first metal, and a metal reinforcement comprising a second metal,
   ultrasonic welding the metal reinforcement to the metal blank to provide a composite blank, and
   deforming the composite blank to form the vehicle component;
   wherein the metal reinforcement comprises a stack of two or more metal layers, the two or more metal layers are ultrasonically welded to each other,
   wherein before ultrasonic welding, the entire metal reinforcement is arranged in a pre-formed depression present in the metal blank,
   wherein the metal reinforcement layer has a bottom surface, and
   wherein the entire bottom surface of the metal reinforcement is ultrasonically welded to the metal blank to form a continuous bond between the metal blank and the metal reinforcement.

2. The method according to claim 1, wherein deforming includes cold stamping.

3. The method according to claim 1, wherein before ultrasonic welding, the metal reinforcement is arranged at a predetermined location relative to the metal blank such that after deforming, the metal reinforcement provides a reinforced region at a desired location on the vehicle component.

4. The method according to claim 1, wherein the second metal is different from the first metal and the second metal is at least one of stronger and stiffer than the first metal.

5. The method according to claim 4, wherein the first metal is an aluminum or aluminum-based alloy and the second metal is a steel or steel-based alloy.

6. The method according to claim 1, wherein an ultrasonic welded bond between the metal blank and the metal reinforcement is arranged completely within the depression.

7. The method according to claim 1, wherein ultrasonic welding includes contacting a sonotrode to an entire top surface of the metal reinforcement.

8. The method according to claim 1, wherein the ultrasonic welding forms a lap joint between the metal reinforcement and the metal blank.

9. The method according to claim 1, further comprising:
   providing reinforcing fibers, and
   before ultrasonic welding, arranging the reinforcing fibers between the metal blank and the metal reinforcement, or between two or more metal layers of the metal reinforcement.

10. A method of preparing a vehicle component comprising:
    providing a metal blank comprising a first metal, and a metal reinforcement comprising a second metal,
    ultrasonic welding the metal reinforcement to the metal blank to provide a composite blank,
    deforming the composite blank to form the vehicle component;
    wherein the metal reinforcement comprises a stack of one or more metal layers,
    wherein if the metal reinforcement comprises the two or more metal layers, the two or more metal layers are ultrasonically welded to each other,
    wherein the method further comprises providing reinforcing fibers, and before ultrasonic welding, arranging the reinforcing fibers between the metal blank and the metal reinforcement, or between two or more metal layers of the metal reinforcement, and
    wherein arranging includes placing the reinforcing fibers in a pre-formed groove of the metal blank or in a pre-formed groove of the metal reinforcement.

11. The method according to claim 10, wherein:
    a viscous material is arranged between the reinforcing fibers and at least one of the metal blank and the metal reinforcement,
    the method further includes heating the vehicle component such that the viscous material a) cures to form an adhesive bond between the reinforcing fibers and at least one of the metal blank and the metal reinforcement, or b) dries or breaks down to allow a mechanical attachment to form between the reinforcing fibers and at least one of the metal blank and the metal reinforcement.

12. The method according to claim 10, wherein:
    the reinforcing fibers are placed in a pre-formed groove of the metal blank;
    the pre-formed groove is arranged in a pre-formed depression present in the metal blank, and
    before ultrasonic welding, the metal reinforcement is arranged in the pre-formed depression.

13. The method according to claim 10, wherein during deforming, the pre-formed groove compresses around the reinforcing fibers to create a mechanical attachment between the reinforcing fibers and the pre-formed groove.

14. The method according to claim 1, wherein the vehicle component is a B-pillar.

* * * * *